United States Patent
Liebscher et al.

(10) Patent No.: US 7,170,443 B2
(45) Date of Patent: Jan. 30, 2007

(54) METHOD FOR THE EVALUATION OF RADAR DATA FOR FULLY AUTOMATIC CREATION OF A MAP OF REGIONS WITH INTERFERENCE

(75) Inventors: Dirk Liebscher, Ulm (DE); Juergen Altmann, Ulm (DE); Ulrich Lode, Ulm (DE); Christoph Schenk, Ulm (DE)

(73) Assignee: EADS Deutschland GmbH, Ottobrunn (DE)

( * ) Notice: Subject to any disclaimer, the term of this patent is extended or adjusted under 35 U.S.C. 154(b) by 142 days.

(21) Appl. No.: 11/070,010

(22) Filed: Mar. 2, 2005

(65) Prior Publication Data

US 2005/0195104 A1    Sep. 8, 2005

(30) Foreign Application Priority Data

Mar. 4, 2004  (DE) .................... 10 2004 010 537

(51) Int. Cl.
*G01S 13/89* (2006.01)
(52) U.S. Cl. .................... 342/195; 342/191; 342/197; 342/95
(58) Field of Classification Search ............... 342/195, 342/197, 190, 191, 95–97
See application file for complete search history.

(56) References Cited

U.S. PATENT DOCUMENTS

| | | | | |
|---|---|---|---|---|
| 4,074,264 A | * | 2/1978 | Wilmot | 342/90 |
| 4,151,523 A | * | 4/1979 | Platt et al. | 342/90 |
| 4,555,703 A | * | 11/1985 | Cantrell | 342/13 |
| 5,341,141 A | | 8/1994 | Frazier et al. | 342/129 |
| 5,341,142 A | * | 8/1994 | Reis et al. | 342/64 |
| 5,430,445 A | * | 7/1995 | Peregrim et al. | 342/25 C |
| 5,798,728 A | | 8/1998 | Tomishima et al. | 342/159 |

(Continued)

FOREIGN PATENT DOCUMENTS

DE          31 08 594          9/1982

(Continued)

OTHER PUBLICATIONS

"Performance of order statistic clutter map CFAR", Tao Shan; Ran Tao; Yue Wang; Siyong Zhou; Signal Processing, 2002 6th International Conference on vol. 2, Aug. 26-30, 2002 Ps:1572-1575.*

(Continued)

*Primary Examiner*—John B. Sotomayor
(74) *Attorney, Agent, or Firm*—Collard & Roe, P.C.

(57) ABSTRACT

A method for the evaluation of radar data for fully automatic creation of a map of regions with interference, in which undesirable reflections frequently occur includes the following method steps. The region to be mapped is divided up into cells. The short-lived target tracks that occur in these cells are counted. Statistics are kept, in such a manner that the short-lived target tracks are counted only within a predetermined period of time, while all older short-lived target tracks are left out of consideration. At least one threshold value is predetermined, in such a manner that a cell is considered to have been marked if the short-lived target tracks that are counted in the previous time period exceed the threshold value or values. The map of the current regions with interference results as the totality of the marked cells.

7 Claims, 1 Drawing Sheet

U.S. PATENT DOCUMENTS

| | | | |
|---|---|---|---|
| 5,818,383 A * | 10/1998 | Stockburger et al. | 342/109 |
| 5,940,523 A * | 8/1999 | Cornman et al. | 382/100 |
| 6,078,281 A * | 6/2000 | Milkovich et al. | 342/196 |
| 6,297,764 B1 * | 10/2001 | Wormington et al. | 342/101 |
| 6,486,831 B1 * | 11/2002 | Martorana et al. | 342/458 |
| 2002/0169735 A1 * | 11/2002 | Kil et al. | 706/46 |
| 2003/0142011 A1 * | 7/2003 | Abramovich et al. | 342/159 |
| 2005/0195104 A1 * | 9/2005 | Liebscher et al. | 342/191 |

FOREIGN PATENT DOCUMENTS

| | | |
|---|---|---|
| DE | 196 00 086 | 7/1997 |
| EP | 0 126 032 | 11/1984 |
| JP | 62137576 A * | 6/1987 |

OTHER PUBLICATIONS

European Search Report with English translation.

"Feasibility of Mitigating the Effects of Windfarms on Primary Radar", ETSU W/14/00623/REP, DTI PUB URN No. 03/976, 2003.

* cited by examiner

METHOD FOR THE EVALUATION OF RADAR DATA FOR FULLY AUTOMATIC CREATION OF A MAP OF REGIONS WITH INTERFERENCE

CROSS REFERENCE TO RELATED APPLICATIONS

Applicants claim priority under 35 U.S.C. §119 of German Application No. 10 2004 010 537.5 filed Mar. 4, 2004.

BACKGROUND OF THE INVENTION

1. Field of the Invention

The present invention relates to a method for the evaluation of radar data for fully automatic creation of a map of regions with interference.

2. The Prior Art

In methods for the evaluation of radar signals, the problem occurs that in addition to the desired echoes from ships and aircraft (true targets), a great number of undesirable reflections are also received. These undesirable reflections include reflections from waves, the ground, clouds, windmills, cars or the like (false targets). In the creation of a position image in which the echoes that belong to a target, in each instance, are joined together to form a target track from the various revolutions of the antenna, so-called false tracks result from the undesirable reflections. These disrupt the otherwise stable position image, confuse the operator, and can thus result in incorrect decisions. The problem is all the more serious as the required initiation time, in other words the time that is allowed to elapse from the first echo to the presentation of a target track on the screen, becomes shorter.

Modern radar systems attempt to suppress false tracks even in the case of short initiation times, by accessing various maps on which regions with interference are shown. For this purpose, a special treatment is performed in regions such as roads or wind farms. For example, this special treatment may consist of a prohibition against initiation. Such methods are described, for example, in the publication of the study: Feasibility of mitigating the effects of wind farms on primary radar, ETSU W/14/00623/REP, DTI (Department of Trade and Industry) UK, PUB URN No. 03/1976, 2003.

The known radar evaluation methods with special consideration of regions with interference have one or more of the following disadvantages:

The map information must be input and updated manually.

They are based exclusively on the analysis of individual echoes and also include those regions in which desirable echoes occur with greater frequency. These are, for example, flight paths and ocean routes, in which reliable initiation is particularly important.

They have a negative influence on the discovery likelihood of the system, which is unacceptable for military uses.

They are connected with significant technical and financial expenditure.

SUMMARY OF THE INVENTION

It is therefore an object of the present invention to provide a method that creates and updates a map of regions with undesirable reflections, completely automatically, whereby a reliable differentiation between false targets and true targets is made possible using the map information.

These and other objects are accomplished, in accordance with the invention by a method for the evaluation of radar data for fully automatic creation of a map of regions with interference, in which undesirable reflections frequently occur.

In accordance with the method, the region to be mapped is divided up into cells, the short-lived target tracks that occur in these cells are counted, and statistics are kept so that the short-lived target tracks are counted only within a predetermined period of time, while all other short-lived target tracks are left out of consideration. At least one threshold value is fixed so that a cell is considered to have been marked if the short-lived target tracks that are counted in the previous time period exceed the threshold value or values. The map of the current regions with interference results as the totality of the marked cells. Advantageous embodiments are discussed below.

BRIEF DESCRIPTION OF THE DRAWINGS

Other objects and features of the present invention will become apparent from the following detailed description considered in connection with the accompanying drawing. It should be understood, however, that the drawing is designed for the purpose of illustration only and not as a definition of the limits of the invention.

In the drawing.

DETAILED DESCRIPTION OF PREFERRED EMBODIMENTS

Figure 1:
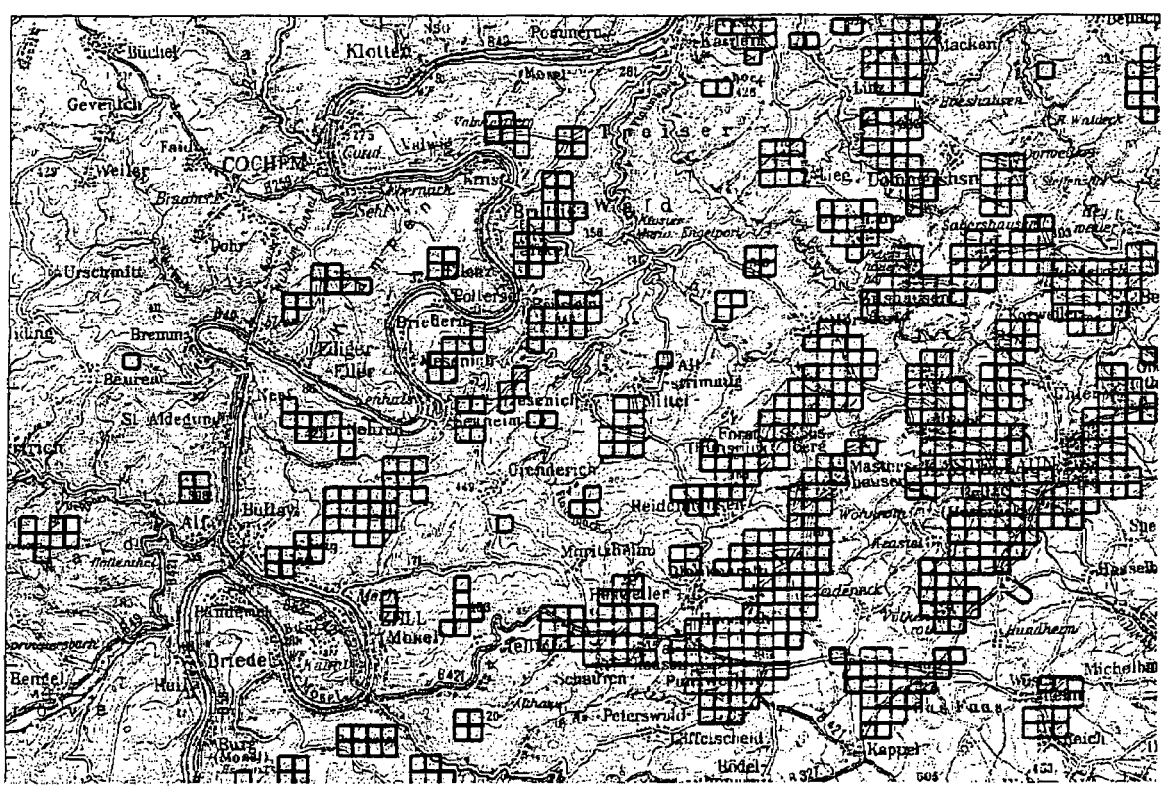
FIG. 1, the sole drawing, shows a map according to an embodiment of the invention with two threshold values.

According to the invention, the map is compiled not on the basis of individual echoes, but rather on the basis of target tracks. The fundamental assumptions are that each short-lived target track (e.g. over less than ten antenna revolutions), in other words including those that are not initiated and therefore also do not reach the screen, has come from an undesirable target.

The region to be mapped is divided into cells, in which the short-lived target tracks that have originated there are counted, in each instance.

The map is aged, so that only those short-lived target tracks are taken into consideration in the count that are younger than a predetermined time span (as a function of the number of echoes, typically between five minutes and two hours). All older short-lived target tracks are left out of consideration. In this manner, the map information obtained according to the invention is not fixed, but rather adapts itself adaptively to the current situation, for example in the case of changes in the environmental conditions, such as clouds, rain, or wind intensity.

A cell is considered to have been marked, i.e. it is defined on the map as a region with interference, if this value exceeds a certain threshold value. In the case of a radar evaluation accessing the information in such a map, echoes that originate from marked cells are subjected to special treatment, e.g. in that track initiation is delayed.

By means of establishing several threshold values, the result is achieved that a cell can achieve different degrees of marking. In this manner, not only a black and white map is obtained, but rather a gray-scale map with several degrees with regard to the interference of the region to be mapped. The higher the degree of classification of a cell as a region with interference, the stricter the requirements with regard to the track formation process. For example, a greater number of antenna revolutions must be taken into consideration for the decision true target/false target.

Advantages of the Invention Include:

Creation and updating of the map take place automatically. Manual administration of the map is not required.

Flight corridors or ocean routes are not affected, because the target tracks that are formed here remain stable over a long period of time (in accordance with a greater number of antenna revolutions). Therefore, these target tracks are not included in the map.

When using the map generated in accordance with the invention in a radar evaluation method, the formation of undesirable target tracks can be reliably suppressed. On the other hand, the detection of desired targets continues to be possible in the regions indicated as having interference.

A short-lived target track that occurs can be included in the count in different ways. For example, a short-lived target track may be assigned to a cell of the map on the basis of the position of its starting point.

Alternatively it is possible that the short-lived target track is sorted on the basis of the location of its end point.

However, the same short-lived target track may also be counted several times, in that an entry is made both for the starting point and for the end point of a target track. In this way, the starting point and the end point can occur in different cells. Analogously, all of the echoes that contribute to a short-lived target track can be included in the count.

In another embodiment of the invention, a count result can be counted not only in the cell in which it actually occurs, but additionally in one or more adjacent cells. This procedure serves for smoothing, in order to avoid the formation of individual discrete peaks within the map.

A threshold value can be fixed. Alternatively, however, it can also be generated automatically, on the basis of the available measurement data. A suitable condition for automatic generation of a threshold value is, for example, that the number of echoes not correlated with true targets, which lie in non-marked cells, reaches a predetermined value, on the average.

FIG. 1, attached as an illustration, shows a map according to an embodiment of the invention, with two threshold values. The marked cells are projected onto a geographical map.

The counters of the cells shown in black lie above a first threshold value and below a second threshold value. Those of the gray cells lie above the second threshold value. In this case, the cell size is approximately 400×400 m.

Although only a few embodiments of the present invention have been shown and described, it is to be understood that many changes and modifications may be made thereunto without departing from the spirit and scope of the invention as defined in the appended claims.

What is claimed is:

1. A method for evaluating radar data for fully automatic creation of a map of regions with interference in which undesirable reflections frequently occur comprising the following steps:
    (a) dividing a region to be mapped into a plurality of cells;
    (b) counting short-lived target tracks that occur in the cells;
    (c) maintaining statistics so that the short-lived target tracks are counted only within a predetermined period of time while leaving out of consideration all short-lived target tracks occurring prior to the predetermined period of time; and
    (d) setting at least one threshold value so that a cell within the plurality of cells is considered to have been marked if the short-lived target tracks that are counted in a previous time period exceeds the at least one threshold value;
    wherein a map of current regions with interference results from a totality of marked cells.

2. The method as recited in claim 1, wherein a short-lived target track having one of the following characteristics is included in the count:
    (a) an end point;
    (b) a starting point and an end point; or
    (c) at least one echo correlated with the short-lived target track.

3. The method as recited in claim 1, wherein a counting result is counted not only in the cell in which it occurs, but additionally in one or more adjacent cells.

4. The method as recited in claim 1, wherein a threshold value is set and automatically calculated, so that the number of echoes not correlated to true targets, which lie in non-marked cells, reaches a predetermined value, on average.

5. The method as recited in claim 1, wherein several threshold values are predetermined, which reproduce different degrees of interference of the region.

6. The method as recited in claim 1, wherein suppression of undesirable false tracks is carried out by accessing information from generated maps.

7. The method as recited in claim 6, wherein in the case of a map that has been generated with several threshold values, higher degrees of interference effect a better defining of a track formation process.

* * * * *